United States Patent [19]

Friedman, deceased et al.

[11] 4,102,815

[45] Jul. 25, 1978

[54] ALPHA HALO SUBSTITUTED ASYMMETRICAL DIACYL PEROXIDES IN CO-INITIATOR SYSTEMS

[75] Inventors: Ronald L. Friedman, deceased, late of San Rafael, Calif., by Patty R. Friedman, executor; Roger N. Lewis, Martinez, Calif.

[73] Assignee: Argus Chemical Corporation, Brooklyn, N.Y.

[21] Appl. No.: 739,416

[22] Filed: Nov. 8, 1976

[51] Int. Cl.$^2$ ............................................. B01J 31/02
[52] U.S. Cl. ................................... 252/426; 526/228; 526/231
[58] Field of Search .................. 526/228, 231; 252/426

[56] References Cited

U.S. PATENT DOCUMENTS

| 3,420,807 | 1/1969 | Harrison et al. | 252/426 X |
|---|---|---|---|
| 3,639,370 | 2/1972 | Edl et al. | 252/426 X |
| 3,652,524 | 3/1972 | Lewis et al. | 526/344 X |
| 3,652,681 | 3/1972 | Wood | 526/231 X |
| 3,687,867 | 8/1972 | Lewis et al. | 252/426 |
| 3,736,306 | 5/1973 | Light | 526/344 X |
| 3,763,128 | 10/1973 | Lewis et al. | 526/228 |
| 3,778,422 | 12/1973 | Farber et al. | 526/228 |
| 3,781,255 | 12/1973 | Balwe et al. | 526/225 |

Primary Examiner—Delbert E. Gantz
Assistant Examiner—William G. Wright
Attorney, Agent, or Firm—Townsend and Townsend

[57] ABSTRACT

Organic peroxide polymerization co-initiator compositions and their use in the initiation of the polymerization of certain monomers and comonomers such as vinyl chloride, ethylene and methyl methacrylate. The co-initiator composition contains an alpha halo substituted diacyl peroxide and a coperoxide selected from t-alkyl peresters of t-hydroperoxides, peroxydicarbonates, acyl peroxycarbonic esters, and aliphatic diacyl peroxides. Typical is acetyl 2-chlorooctanoyl peroxide with t-butyl peroxy neodecanoate.

16 Claims, No Drawings

ALPHA HALO SUBSTITUTED ASYMMETRICAL DIACYL PEROXIDES IN CO-INITIATOR SYSTEMS

BACKGROUND OF THE INVENTION

1. Field of the Invention

This invention relates to organic peroxide compositions and their use in the polymerization of monomers and comonomers. More particularly, the invention relates to co-initiator compositions which combine an alpha halo substituted diacyl peroxide with a coperoxide.

2. Brief Description of the Prior Art

Various co-initiator compositions have been employed for initially polymerization of monomers such as vinyl chloride. U.S. Pat. Nos. 3,687,867 and 3,420,807 disclose co-initiator systems containing peresters and diacyl peroxides.

U.S. Pat. Nos. 3,022,282 and its Reissue 25,763 disclose the use of a combination of dialkyl peroxy dicarbonate with lauroyl peroxide.

U.S. Pat. No. 3,781,255 discloses a co-catalyst system of tertiary alkyl peresters with acetyl cyclohexyl sulfonyl peroxide (ACSP).

Alpha halo substituted asymmetrical diacyl peroxides (AHSADP) of the type used in the present co-initiator system are disclosed in U.S. Pat. No. 3,652,681, but not in a co-initiator system.

Acyl peroxy carbonic esters of the type utilized herein as coperoxides with AHSADP are disclosed in U.S. Pat. Nos. 3,585,232, 3,652,524, 3,736,344 and 3,108,093, but not in a co-initiator system.

DESCRIPTION OF THE SPECIFIC EMBODIMENTS

The novel co-initiator compositions of this invention provide improvements over the prior art in several ways. The polymer end product obtained with the use of the present initiators demonstrates improved heat stability, as well as having a finer particle size distribution. The co-initiators also demonstrate improved efficiencies in polymer yield, particularly under certain polymerization conditions. In accordance with the present invention these improvements are obtained with an organic peroxide polymerization co-initiator composition comprising:

(a) an alpha halo substituted diacyl peroxide of the structure

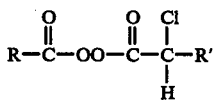

where
$R$ = alkyl group of 1-11 carbon atoms and
$R'$ = alkyl group of 2-10 carbon atoms; and
(b) a coperoxide selected from
(1) t-alkyl peresters of t-hydroperoxides of the structure

where
$R$ = t-alkyl of 4-20 carbon atoms and
$R'$ = t-alkyl of 4-20 carbon atoms (2) peroxydicarbonates of the structure

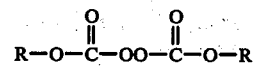

where each $R$ = alkyl or cycloalkyl of 1-18 carbon atoms (3) acyl peroxycarbonic esters of the structure

where
$R$ = alkyl or aryl of 1-11 carbon atoms and
$R'$ = alkyl of 1-18 carbon atoms (4) aliphatic diacyl peroxides of the structure

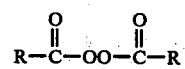

where each $R$ = alkyl of 2-11 carbon atoms

In the case where the coperoxide is a t-alkyl perester of a t-hydroperoxide, the perester preferably has the formula

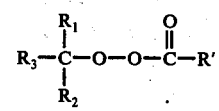

wherein $R'$ has the above definition, $R_1$ and $R_2$ are alkyl groups with 1-4 carbon atoms and $R_3$ is a straight-chain or branched alkyl group with 1-18 carbon atoms.

Examples of such peresters are found in the peresters utilized in the co-catalyst system of U.S. Pat. No. 3,781,255. Within these preferred peresters it is desirable that $R'$ have the formula

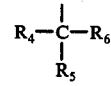

in which each of $R_4$, $R_5$ and $R_6$ is an alkyl group and where no more than one of $R_4$, $R_5$ and $R_6$ is a methyl group. Preferred peresters of this latter type are utilized in the co-initiator systems of U.S. Pat. No. 3,687,867.

Examples of peroxy dicarbonate coperoxides are secbutyl peroxydicarbonate (SBPC) and diisopropyl peroxydicarbonate (IPP).

Examples of acyl peroxycarbonic ester coperoxides are found in the above cited prior art patents, the disclosures of which are incorporated herein by reference.

Typical aliphatic diacyl peroxides include lauroyl peroxide, decanoyl peroxide and 3,5,5-trimethyl hexanoyl peroxide.

The co-initiators are employed in any weight ratio which provides the desired improved results. Typically, the weight ratio of alpha halo substituted diacyl peroxide to coperoxide is about 3:1 to 1:3, perferably 1:2.

The co-initiator is utilized to initiate the polymerization of various monomers and comonomers. To date the present co-initiators have been found to be beneficial in the polymerization of vinyl chloride monomer to form polyvinyl chloride homopolymer and for copolymerization of vinyl chloride with comonomer such as vinyl acetate. The co-initiators are also useful for the polymerization of ethylene and acrylates such as methyl methacrylate. Generally, the polymerization conditions will be similar to the prior art polymerization of these monomers in terms of concentrations, solvents, temperatures, pressures and the like. For example, the temperature range for polymerization of the above mentioned monomers and comonomers with the exception of ethylene is approximately 30°–80° C. Ethylene is polymerized at elevated temperatures and pressure as is known in the art. In the case of the polymerization of vinyl chloride, in accordance with the present invention best results have thus far been obtained where the polymerization is executed in a aqueous suspension medium at a pH of about 11.

The following examples will illustrate the present invention. For comparison, the present co-initiators were tested against co-initiator systems containing ACSP as disclosed in U.S. Pat. No. 3,781,255. This comparative prior art system was selected because it is presently the preferred commercial system and has approximately the same ten hour half-life temperature as the present alpha halo substituted diacyl peroxides.

Throughout this application the following abbreviations are used:
TBPN — t-butyl peroxyneodecanoate
TBPP — t-butyl peroxypivalate
APPC — acetyl peroxy n-propyl carbonate
A2ClOP — acetyl 2-chlorooctanoyl peroxide
P2ClOP — propionyl 2-chlorooctanoyl peroxide
L2CLBP — lauroyl 2-chlorobutyryl peroxide A series of suspension polymerizations were executed in pop bottles with the results shown in Tables 1–3. In general, the suspension polymerizations were performed in pop bottles similar to the method described in patent application Ser. No. 520,072 filed Nov. 1, 1974.

Both uninhibited vinyl chloride and vinyl acetate were used in this work. The following table lists some general information about the polymerization procedure used:

| Mixing Speed, RPM | $H_2O$/Monomer Ratio | Amt. Suspension Agent/100 g. Monomer |
|---|---|---|
| 42 | 2.5 | 0.35 g. Dow Methocel 90 HG, 100 cps |

Buffering solutions were prepared as shown in the following table. pH of each suspension solution was determined by use of a pH meter.

| pH | Amount Buffering Agents/100 g. Monomer |
|---|---|
| 4 | 3.83 g. potassium hydrogen phthalate and 0.0014 g. HCl |
| 11 | 0.23 g. NaOH and 0.54 g. $NaHCO_3$ |

Table 1

Comparison Between Co-initiator Systems as Initiators of Vinyl Chloride at 55° C.

| Co-initiator System | % Wt. | Total Moles/100 g. VCM ($\times 10^{-4}$ moles) | pH | % Conversion Hrs. 1.5 | 3.5 | 5.5 |
|---|---|---|---|---|---|---|
| 1. TBPN/ACSP | 0.0367/0.0183 | 2.33 | 7 | 31.3 | 63.9 | 82.4 |
|  |  |  | 4 | 35.6 | 68.1 | 81.4 |
|  |  |  | 11 | 16.9 | 43.4 | 65.8 |
| 2 TBPN/A2ClOP | 0.0367/0.0196 | 2.33 | 7 | 24.2 | 60.6 | 79.2 |
|  |  |  | 4 | 27.7 | 64.3 | 80.8 |
|  |  |  | 11 | 25.2 | 55.9 | 77.6 |
| 3. TBPP/ACSP | 0.0367/0.0183 | 2.94 | 7 | 35.6 | 66.1 | 81.5 |
|  |  |  | 4 | 27.0 | 52.1 | 71.8 |
|  |  |  | 11 | 10.7 | 27.0 | 57.3 |
| 4 TBPP/A2ClOP | 0.0367/0.0196 | 2.94 | 7 | 15.9 | 46.9 | 65.6 |
|  |  |  | 4 | 16.0 | 47.2 | 66.1 |
|  |  |  | 11 | 15.3 | 38.3 | 57.6 |

Table 2

Comparison Between Co-initiator Systems as Initators of Vinyl Chloride at 60° C.

| Co-initiator System | % Wt. | Total Moles/100 g. VCM ($\times 10^{-4}$ moles) | pH | % Conversion Hrs. 1.5 | 3.5 | 5.0 |
|---|---|---|---|---|---|---|
| 1. TBPN/ACSP | 0.034/0.017 | 2.16 | 7 | 34.1 | 69.0 | 79.7 |
|  |  |  | 4 | 44.3 | 73.5 | 80.8 |
|  |  |  | 11 | 24.1 | 53.9 | 70.4 |
| 2. TBPN/A2ClOP | 0.034/0.0182 | 2.16 | 7 | 33.5 | 70.4 | 80.1 |
|  |  |  | 4 | 30.3 | 68.1 | 79.5 |
|  |  |  | 11 | 29.2 | 65.3 | 78.3 |
| 3. TBPN/P2ClOP | 0.034/0.0193 | 2.16 | 7 | 35.5 | 70.4 | 80.5 |
|  |  |  | 4 | 36.5 | 73.2 | 82.2 |
|  |  |  | 11 | 33.2 | 65.4 | 78.3 |
| 4. TBPN/L2ClBP | 0.034/0.0247 | 2.16 | 7 | 34.3 | 70.6 | 80.5 |
|  |  |  | 4 | 33.6 | 66.9 | 78.4 |
|  |  |  | 11 | 31.8 | 67.4 | 78.3 |
| 5. TBPP/ACSP | 0.0367/0.0183 | 2.94 | 7 | 33.6 | 64.6 | 80.4 |
|  |  |  | 4 | 32.7 | 64.1 | 79.8 |
|  |  |  | 11 | 15.7 | 44.6 | 64.6 |
| 6. TBPP/A2ClOP | 0.0367/0.0196 | 2.94 | 7 | 23.9 | 58.5 | 76.4 |
|  |  |  | 4 | 23.5 | 58.8 | 77.0 |
|  |  |  | 11 | 23.7 | 53.7 | 75.8 |
| 7. SBPC/ACSP | 0.0255/0.0085 | 1.47 | 7 | 32.5 | 65.7 | 82.2 |
|  |  |  | 4 | 30.9 | 63.3 | 80.1 |
|  |  |  | 11 | 37.5 | 51.1 | 66.5 |
| 8. SBPC/A2ClOP | 0.0255/0.0091 | 1.47 | 7 | 28.2 | 63.6 | 79.4 |
|  |  |  | 4 | 29.3 | 62.2 | 77.4 |
|  |  |  | 11 | 27.1 | 52.7 | 70.4 |
| 9. APPC/ACSP | 0.0307/0.0153 | 2.58 | 7 | 29.4 | 56.6 | 78.2 |

Table 2-continued
Comparison Between Co-initiator Systems as Initators of Vinyl Chloride at 60° C.

| Co-initiator System | % Wt. | Total Moles/ 100 g. VCM (X $10^{-4}$ moles) | pH | % Conversion Hrs. 1.5 | 3.5 | 5.0 |
|---|---|---|---|---|---|---|
| 10. APPC/A2ClOP | 0.0307/0.0164 | 2.58 | 4 | 29.4 | 56.5 | 76.8 |
| | | | 11 | 3.8 | 4.5 | 4.7 |
| | | | 7 | 24.3 | 56.7 | 74.9 |
| | | | 4 | 21.5 | 51.0 | 72.6 |
| | | | 11 | 11.0 | 16.8 | 20.7 |

Table 3
Comparison Between Co-initiator Systems as Initiators in Copolymerization of Vinyl Chloride/Vinyl Acetate
88%/12% Vinyl Chloride/Vinyl Acetate

| | Co-initiator System | % Wt. | Total Moles/ 100 g.Monomer (× $10^{-4}$ moles) | pH | Polym. Temp., °C | % Conversion Hrs. 1.5 | 3.5 | 5.0 | 5.5 |
|---|---|---|---|---|---|---|---|---|---|
| Set 1 | | | | | | | | | |
| 1. | TBPN/ACSP | 0.0367/0.0183 | 2.33 | 7 | 55 | 34.7 | 66.9 | — | 80.8 |
| 2. | TBPN/A2ClOP | 0.0367/0.0196 | 2.33 | 7 | 55 | 25.0 | 59.3 | — | 78.4 |
| Set 2 | | | | | | | | | |
| 3. | TBPN/ACSP | 0.034/0.017 | 2.16 | 7 | 60 | 37.3 | 68.3 | 76.3 | — |
| | | | | 11 | 60 | 34.7 | 61.8 | 72.1 | — |
| 4. | TBPN/A2ClOP | 0.034/0.0182 | 2.16 | 7 | 60 | 26.0 | 64.0 | 75.0 | — |
| | | | | 11 | 60 | 34.8 | 62.6 | 71.7 | — |
| 5. | TBPP/ACSP | 0.0367/0.0183 | 2.94 | 7 | 60 | 31.7 | 61.6 | 76.9 | — |
| | | | | 11 | 60 | 28.6 | 57.5 | 73.6 | — |
| 6. | TBPP/A2ClOP | 0.0367/0.0196 | 2.94 | 7 | 60 | 23.5 | 55.3 | 72.3 | — |
| | | | | 11 | 60 | 24.3 | 53.5 | 70.3 | — |
| 7. | APPC/ACSP | 0.0307/0.0153 | 2.58 | 7 | 60 | 27.9 | 56.8 | 75.5 | — |
| 8. | APPC/A2ClOP | 0.0307/0.0164 | 2.58 | 7 | 60 | 24.0 | 52.1 | 72.3 | — |

Table 1 at 55° C

The coinitiator system of TBPN/A2ClOP has almost equivalent efficiency at pH's 4 and 7 as TBPN/ACSP, and has superior efficiency at pH 11. The coinitiator system of TBPP/A2ClOP is not as efficient at pH's 4 and 7 as TBPP/ACSP, but is as efficient at pH 11. In addition, the drop-off in conversion at pH 11 with TBPP/A2ClOP is not as large as with TBPP/ACSP.

Table 2 at 60° C

All of the coinitiator systems of TBPN/AHSADP performed as efficiently at pH's 4 and 7 compared to TBPN/ACSP as occurred at 55° C. Again, superior performance was obtained at pH 11. With the other three co-initiator pairs, the ones containing A2ClOP have almost equivalent efficiencies at pH's 4 and 7 and superior efficiencies at pH 11 compared to the ones containing ACSP.

In the copolymerization of 88%/12% vinyl chloride/vinyl acetate in Table 3, testing was done at two pH levels: 7 and 11. The co-initiator system of TBPN/A2ClOP is almost as efficient as TBPN/ACSP at both 55° and 60° C. However, with the other two co-initiator pairs, the systems containing A2ClOP are not quite as efficient as those containing ACSP. In addition, the superior performance found at pH 11 in homopolymerization is not evident in copolymerization.

Another way of demonstrating the advantage gained from the present preferred co-initiator systems containing AHSADP is to compare the heat stability of these resins to those made from coinitiator systems containing ACSP. The same weight ratios of initiators were used as shown in Tables 1–3 at pH 7, so that heat stability of the resin pairs obtained at the same total molar initiator levels were compared. Both homopolymer and copolymer resins were collected; each was a composite of five bottles. Outstanding results were obtained with the copolymer resins. Typical formulations were chosen where copolymer resins would normally be used, as for calendered and/or vacuum-formed clear sheets or for phonograph records. The control is a commercial 85/15 vinyl chloride/vinyl acetate copolymer (VYHH, Union Carbide) used in these applications. Tests were run similar to those described in Tables III–V of U.S. Pat. No. 3,558,537. Results are found in Tables 4 and 5. In four out of five resin pair comparisons, the resins made from coinitiator systems containing AHSADP had superior heat stability. All the resins were better than the control in both tests.

Table 4
Heat Stability of Vinyl Chloride/Vinyl Acetate Copolymer Resins Collected at 60° C at pH 7
Tested at 350° F., 60 parts resin milled with 1.8 parts dibutyl tin dialkyl maleate

| Coperoxide (A) | TBPP | TBPP | APPC | APPC | TBPN | Control |
|---|---|---|---|---|---|---|
| ACSP or A2ClOP (B) | ACSP | A2ClOP | ACSP | A2ClOP | A2ClOP | |
| Avg. Resin Yield, g. | 57.42 | 54.05 | 56.39 | 52.62 | 55.79 | — |
| Standard Deviation | 0.20 | 0.27 | 0.30 | 0.30 | 0.04 | — |
| Elapsed Time, Minutes | | | | | | |
| 0 | Colorless | Colorless | Colorless | Colorless | Colorless | Colorless |
| 15 | " | " | " | " | " | " |
| 30 | Pale Yellow | " | Pale Yellow | " | " | Olive Green |
| 45 | Lt. Yellow | Pale Yellow | Lt. Green | Pale Yellow | Pale Yellow | Green Brown |
| 60 | Med. Olive Green | Lt. Green | Med. Olive Green | Lt. Yellow Green | Lt. Yellow Green | Lt. Brown |
| 75 | Dark Olive | Med. Olive | Dark Olive | Med. Yellow | Med. Yellow | Med. Brown |

Table 4-continued

Heat Stability of Vinyl Chloride/Vinyl Acetate Copolymer Resins Collected at 60° C at pH 7
Tested at 350° F., 60 parts resin milled with 1.8 parts dibutyl tin dialkyl maleate

| | | | | | | |
|---|---|---|---|---|---|---|
| 90 | Green Med. Green Brown | Green Dark Olive Green | Green Dark Green Brown | Green Med. Straw Yellow | Green Dark Olive Green | Dark Brown |
| 105 | Dark Brown | Lt. Brown | Dark Brown | Dark Straw Yellow | Lt. Brown | Dark Brown |

Table 5

Heat Stability of Vinyl Chloride/Vinyl Acetate Copolymer Resins Collected at 60° C at pH 7
Tested at 300° F., 60 parts resin milled with 0.6 part lead barium laurate

| Coperoxide (A) | TBPN | TBPN | TBPP | TBPP | APPC | APPC | Control |
|---|---|---|---|---|---|---|---|
| ACSP or A2C1OP (B) | ACSP | A2C1OP | ACSP | A2C1OP | ACSP | A2C1OP | — |
| Avg. Resin Yield, g. | 57.78 | 55.79 | 57.42 | 54.05 | 56.39 | 52.62 | — |
| Standard Deviation | 0.29 | 0.04 | 0.20 | 0.27 | 0.30 | 0.30 | — |
| Elapsed Time, Minutes | | | | | | | |
| 0 | Colorless | Colorless | Colorless | Colorless | Colorless | Colorless | Colorless |
| 15 | " | " | " | " | " | " | " |
| 30 | " | " | " | " | " | " | Pale Yellow |
| 45 | Pale Yellow | " | Pale Yellow | Pale Yellow | Pale Yellow | Pale Yellow | Black |
| 60 | Lt. Yellow | Pale Yellow | Lt. Yellow | Lt. Yellow | Lt. Yellow | Lt. Yellow | " |
| 75 | " | " | " | Lt. Olive Green | Lt. Olive Green | " | — |
| 90 | Olive Green | Pale Green | Lt. Olive Green | Olive Green | Yellow Green | Lt. Olive Green | — |
| 105 | Med. Green | Lt. Olive Green | Olive Green | Med. Green | Med. Yellow Green | Med. Yellow Green | — |
| 120 | Dark Green Brown | Med. Yellow Green | Med. Yellow Green | Dark Yellow Green | Green | " | — |

Sieve analyses were also run on the resins collected for heat stability testing. Two hundred grams of composite resin were added to the top sieve (20 mesh) in the stack. The stack was covered and placed in a Cenco-Meinzer Sieve Shaker for ten minutes at 5 setting on the control dial (10 maximum). Results of testing resins made from four co-initiator pairs are shown in Table 6. As can be seen, resins made from the preferred co-initiator systems containing AHSADP have a finer particle size distribution in three out of four pairs.

Table 6

Sieve Analysis of Various Resins Collected at 60° C. at pH 7

| Co-initiator System | Avg. Resin Yield, g. | Standard Deviation | Sieve Analysis - % Retained on Tyler Standard Sieve | | | | | |
|---|---|---|---|---|---|---|---|---|
| | | | Sieve No. | 20 | 35 | 60 | 80 | 100 | Pan |
| Set 1 - Homopolymer | | | | | | | | | |
| 1. TBPP/ACSP | 60.95 | 0.25 | | 3.3 | 36.0 | 39.8 | 7.5 | 4.2 | 9.5 |
| TBPP/A2C1OP | 59.12 | 0.09 | | 2.3 | 25.5 | 42.6 | 10.8 | 5.8 | 13.0 |
| 2. SBPC/ACSP | 61.94 | 0.23 | | 3.5 | 36.4 | 40.1 | 8.0 | 4.1 | 7.9 |
| SBPC/A2C1OP | 59.43 | 0.18 | | 3.7 | 31.0 | 41.5 | 9.5 | 4.8 | 9.5 |
| Set 2 - Copolymer | | | | | | | | | |
| 3. TBPN/ACSP | 57.78 | 0.29 | | 2.5 | 10.7 | 56.1 | 13.0 | 7.2 | 10.5 |
| TBPN/A2C1OP | 55.79 | 0.04 | | 2.6 | 7.4 | 50.1 | 17.2 | 8.9 | 13.8 |
| 4. APPC/ACSP | 56.39 | 0.30 | | 3.1 | 5.9 | 52.5 | 17.2 | 9.1 | 12.2 |
| APPC/A2C1OP | 52.62 | 0.30 | | 6.9 | 7.2 | 43.1 | 19.4 | 9.5 | 13.9 |

We claim:

1. An organic peroxide polymerization co-initiator composition consisting essentially of:

(a) an alpha halo substituted diacyl peroxide of the structure

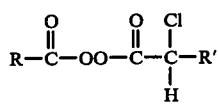

where
R = alkyl group of 1–11 carbon atoms and
R' = alkyl group of 2–10 carbon atoms; and (b) a coperoxide selected from (1) t-alkyl peresters of t-hydroperoxides of the structure

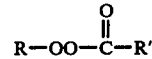

where
R = t-alkyl of 4–20 carbon atoms and
R' = t-alkyl of 4–20 carbon atoms (2) peroxydicarbonates of the structure $$R-O-\overset{O}{\underset{\|}{C}}-OO-\overset{O}{\underset{\|}{C}}-O-R$$

where each R = alkyl or cycloalkyl of 1–18 carbon atoms (3) acyl peroxycarbonic esters of the structure

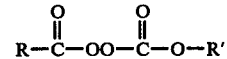

where
R = alkyl or aryl of 1–11 carbon atoms and
R' = alkyl of 1–18 carbon atoms (4) aliphatic diacyl peroxides of the structure

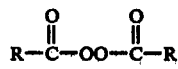

where each R = alkyl of 2-11 carbon atoms; and wherein the weight ratio of alpha halo substituted diacyl peroxide to coperoxide is about 3:1 to 1:3.

2. An organic peroxide polymerization co-initiator composition in accordance with claim 1, wherein said coperoxide selected from t-alkyl peresters of t-hydroperoxides has the formula:

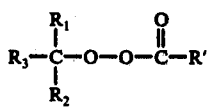

wherein R' has the definition of claim 1, $R_1$ and $R_2$ are alkyl groups with 1-4 carbon atoms and $R_3$ is a straight-chain or branched alkyl group with 1-18 carbon atoms.

3. An organic peroxide polymerization co-initiator composition in accordance with claim 2, wherein R' has the formula:

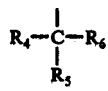

in which each of $R_4$, $R_5$ and $T_6$ is an alkyl group.

4. An organic peroxide polymerization co-initiator composition in accordance with claim 3, wherein each of $R_4$, $R_5$ and $R_6$ is methyl.

5. An organic peroxide polymerization co-initiator composition in accordance with claim 3, wherein not more than one of $R_4$, $R_5$ and $R_6$ is a methyl group.

6. An organic peroxide polymerization co-initiator composition in accordance with claim 3, wherein $R_4$, $R_5$ and $R_6$ collectively contain 8 carbon atoms to form part of a neodecanoate group.

7. An organic peroxide polymerization co-initiator composition in accordance with claim 1 wherein said coperoxide is the peroxydicarbonate sec-butyl peroxydicarbonate.

8. An organic peroxide polymerization co-initiator composition in accordance with claim 1, wherein said coperoxide is a t-alkyl perester of a t-hydroperoxide as defined therein.

9. An organic peroxide polymerization co-initiator composition in accordance with claim 1, wherein said coperoxide is a peroxydicarbonate as defined therein.

10. An organic peroxide polymerization co-initiator composition in accordance with claim 1, wherein said coperoxide is an acyl peroxycarbonic ester as defined therein.

11. An organic peroxide polymerization co-initiator composition in accordance with claim 1, wherein said coperoxide is an aliphatic diacyl peroxide as defined therein.

12. An organic peroxide polymerization co-initiator composition in accordance with claim 1 wherein said coperoxide is the acyl peroxycarbonic ester acetyl peroxy n-propyl carbonate.

13. An organic peroxide polymerization co-initiator composition in accordance with claim 1, wherein said alpha halo substituted diacyl peroxide is acetyl 2-chlorooctanoyl peroxide.

14. An organic peroxide polymerization co-initiator composition in accordance with claim 1, wherein said alpha halo substituted diacyl peroxide is propionyl 2-chlorooctanoyl peroxide.

15. An organic peroxide polymerization co-initiator composition in accordance with claim 1, wherein said alpha halo substituted diacyl peroxide is lauroyl 2-chlorobutyryl peroxide.

16. An organic peroxide co-initiator composition in accordance with claim 1, wherein the weight ratio of alpha halo substituted peroxide to coperoxide is about 1:2.

* * * * *